United States Patent
Gudewer et al.

(10) Patent No.: US 11,624,352 B2
(45) Date of Patent: Apr. 11, 2023

(54) ROTOR BLADE, ROTOR AND WIND POWER INSTALLATION, AND METHOD

(71) Applicant: Wobben Properties GmbH, Aurich (DE)

(72) Inventors: Wilko Gudewer, Norden (DE); Jonas Schmid, Westerstede (DE); Thorsten Fleßner, Aurich (DE); Nico Gloystein, Westerstede (DE)

(73) Assignee: Wobben Properties GmbH, Aurich (DE)

( * ) Notice: Subject to any disclaimer, the term of this patent is extended or adjusted under 35 U.S.C. 154(b) by 174 days.

(21) Appl. No.: 17/100,392

(22) Filed: Nov. 20, 2020

(65) Prior Publication Data
US 2021/0156364 A1    May 27, 2021

(30) Foreign Application Priority Data

Nov. 21, 2019   (DE) .......................... 102019131493.3

(51) Int. Cl.
| | |
|---|---|
| *F03D 1/06* | (2006.01) |
| *F03D 80/50* | (2016.01) |
| *F03D 80/70* | (2016.01) |

(52) U.S. Cl.
CPC ........... *F03D 80/70* (2016.05); *F03D 1/0658* (2013.01); *F03D 80/50* (2016.05); *F05B 2230/80* (2013.01); *F05B 2240/50* (2013.01); *F05B 2260/301* (2013.01)

(58) Field of Classification Search
CPC ....... F03D 1/0658; F03D 80/70; F03D 7/0224
See application file for complete search history.

(56) References Cited

U.S. PATENT DOCUMENTS

| | | | | |
|---|---|---|---|---|
| 7,987,600 | B2 * | 8/2011 | Erill ...................... | F16C 43/045 |
| | | | | 29/898.07 |
| 8,043,012 | B2 * | 10/2011 | Rogall .................... | F16C 33/76 |
| | | | | 384/477 |
| 8,147,202 | B2 * | 4/2012 | Bech ........................ | F03D 80/70 |
| | | | | 416/204 R |
| 8,591,187 | B2 * | 11/2013 | Bagepalli .............. | F03D 1/0658 |
| | | | | 416/61 |
| 9,109,579 | B2 * | 8/2015 | Lin ........................ | F16C 33/768 |

(Continued)

FOREIGN PATENT DOCUMENTS

| | | | |
|---|---|---|---|
| CN | 101915211 A | * | 12/2010 |
| DE | 102007052383 A1 | | 5/2008 |

(Continued)

*Primary Examiner* — Justin D Seabe
(74) *Attorney, Agent, or Firm* — Seed Intellectual Property Law Group LLP

(57) ABSTRACT

A rotor blade for a rotor of a wind power installation, to a rotor for a wind power installation, to a wind power installation having a rotor blade and/or having a rotor, and to a method for connection of a rotor blade at a hub of a rotor of a wind power installation. The rotor blade comprises a hub-side end for fastening the rotor blade to a movable part of a blade bearing, wherein a bearing cover is arranged on an outer circumferential surface of the hub-side end of the rotor blade, wherein a portion of the bearing cover that is close to the bearing is further away from the outer circumferential surface of the hub-side end of the rotor blade than a portion of the bearing cover that is remote from the bearing by a multiple.

4 Claims, 14 Drawing Sheets

(56) References Cited

U.S. PATENT DOCUMENTS 9,765,646 B2 * 9/2017 Lipka .................. F03D 80/00
2019/0331091 A1 10/2019 Bech

FOREIGN PATENT DOCUMENTS

| DE | 102007032937 A1 | 1/2009 |
| DE | 102016203269 A1 | 8/2017 |
| EP | 2527676 A1 | 11/2012 |
| WO | 2012/175204 A1 | 12/2012 |

* cited by examiner

ROTOR BLADE, ROTOR AND WIND POWER INSTALLATION, AND METHOD

BACKGROUND

Technical Field

The invention relates to a rotor blade for a rotor of a wind power installation, to a rotor for a wind power installation, to a wind power installation having a rotor blade and/or having a rotor, and to a method for connection of a rotor blade at a hub of a rotor of a wind power installation.

Description of the Related Art

Wind power installations generally have a tower and a nacelle on the tower. An aerodynamic rotor having typically three rotor blades fastened to a hub is normally provided on the nacelle. For wind power installations of today's dimensions, such an aerodynamic rotor can generally no longer be transported as a whole unit. The rotor blades are therefore generally manufactured separately and connected to the hub on-site. This connection between rotor blade and hub has to be subjected to high requirements, on the one hand as far as the security and reliability of the connection, in particular during the operation of the wind power installation, is concerned, but on the other hand also for ease of assembly and for possible means of performing inspection, maintenance and possibly repair work.

BRIEF SUMMARY

Provided is an improved rotor blade for a rotor of a wind power installation, an improved rotor for a wind power installation, an improved wind power installation having a rotor blade and/or having a rotor, and an improved method for connection of a rotor blade at a hub of a rotor of a wind power installation.

In particular, provided is a rotor blade for a rotor of a wind power installation, a rotor for a wind power installation, a wind power installation having a rotor blade and/or having a rotor, and a method for connection of a rotor blade at a hub of a rotor of a wind power installation that ensure a secure and reliable connection, in particular during the operation of the wind power installation, and at the same time provide an assembly- and service-friendly and inexpensive solution.

Provided is a rotor blade for a rotor of a wind power installation, the rotor blade comprising a hub-side end for fastening the rotor blade to a movable part of a blade bearing, wherein a bearing cover is arranged on an outer circumferential surface of the hub-side end of the rotor blade, wherein a portion of the bearing cover that is close to the bearing is further away from the outer circumferential surface of the hub-side end of the rotor blade than a portion of the bearing cover that is remote from the bearing by a multiple.

The rotor blade described here is provided for fastening to a hub of a rotor of a wind power installation. Generally, a rotor blade has a rotor blade tip and a hub-side end, which is generally situated opposite the rotor blade tip. The hub-side end of a rotor blade preferably has a planar and/or annular face surface. The rotor blade can be fastened by way of said hub-side end to a hub of a rotor.

For wind power installations, it is in some cases provided that, between the hub and the rotor blade, provision is made of an adapter element, which may also be referred to as a hub adapter. In the present application, the term "hub" preferably also covers further possibly provided elements, such as for example a hub adapter.

Descriptions such as "radial", "axial", "in a circumferential direction", etc., unless indicated otherwise, relate to a longitudinal axis of a rotor blade.

The fastening of the rotor blade to the hub is generally realized via a blade bearing which has a movable part and has a fixed part. The rotor blade is fastened by way of its hub-side end to the movable part of the blade bearing. The fixed part of the blade bearing is preferably arranged on the hub and may be fastened, for example in a detachable manner, to the hub or else designed as part of the hub. The fixed part of the blade bearing is fixed in relation to the hub, but preferably also performs the movements of the hub (for example rotational movements of the rotor). The movable part of the blade bearing is movable, in particular rotationally movable, in relation to the fixed part of the blade bearing, to allow adjustment of the rotor blade, for example via pitch motors.

The connection between rotor blade and hub via the blade bearing is a connection which is subjected to high loads during operation, and which is relevant therefore to security and reliability but also to ease of assembly and of servicing and also cost-effectiveness of a wind power installation. The rotor blade described here then provides that a bearing cover is arranged on an outer circumferential surface of the hub-side end of the rotor blade. The bearing cover has a portion close to the bearing and a portion remote from the bearing. In the fitted state of the rotor blade on the hub, that portion of the bearing cover which is close to the bearing is (in particular in an axial direction of the rotor blade) situated closer to the blade bearing than that portion of the bearing cover which is remote from the bearing. The bearing cover is formed such that the portion close to the bearing is further away from the outer circumferential surface of the hub-side end of the rotor blade (in particular in a radial direction) than that portion of the bearing cover which is remote from the bearing by a multiple. In this way, at the hub-side end of the rotor blade, there is formed between the bearing cover and the outer circumferential surface of the hub-side end of the rotor blade an intermediate space, which can be used for the arrangement of further elements, such as for example fastenings.

The provision of a bearing cover as described here has various advantages. For example, the bearing cover protects that region of the connection, in particular of the blade bearing, which is covered by said bearing cover from environmental influences and reduces for example the ingress of rain and/or dirt. This may be advantageous in particular for wind power installations whose rotor has no spinner.

According to a preferred embodiment, it is provided that an intermediate space is formed between the outer circumferential surface of the hub-side end of the rotor blade and that portion of the bearing cover which is close to the bearing, and serves for accommodating a portion of a fixed part of the blade bearing.

The accommodation of a portion of a fixed part of the blade bearing in the intermediate space between that portion of the bearing cover which is close to the bearing and the outer circumferential surface of the hub-side end of the rotor blade is particularly preferable since, in this way, that portion of the fixed part of the blade bearing which is covered by the bearing cover is correspondingly protected. Preferably, a portion of the movable part of the blade bearing is also arranged in the intermediate space. In particular, the portion of the fixed part of the blade bearing and/or the portion of the movable part of the blade bearing, which face the rotor blade, are preferably arranged in the intermediate space. In particular the heads of the blade fastening bolts, which point in the direction of the rotor blade, are preferably arranged in the intermediate space. The intermediate space is preferably arranged in an annular manner, and preferably extends at the hub-side end of the rotor blade between the outer circumferential surface of the rotor blade and that portion of the bearing cover which is close to the bearing.

It is furthermore preferable for the rotor blade to have at its hub-side end a plurality of blade blind holes for receiving blade fastening bolts for fastening the rotor blade to a movable part of a blade bearing of a hub of a rotor of a wind power installation.

The plurality of blade blind holes for receiving blade fastening bolts is preferably arranged in the face surface of the hub-side end of the rotor blade. It is furthermore preferable for the blade blind holes to be of annular form and/or spaced apart from one another, preferably equidistantly, in a circumferential direction.

In a preferred embodiment, it is provided that the portion of the bearing cover which is remote from the bearing and that portion of the bearing cover which is close to the bearing are arranged substantially parallel to one another and/or radially spaced apart from one another.

A preferred refinement is distinguished by the fact that the bearing cover has an intermediate portion which is arranged between the portion remote from the bearing and the portion close to the bearing. It is furthermore preferable for the intermediate portion to be arranged substantially orthogonally to the portion remote from the bearing and/or to the portion close to the bearing. The intermediate portion may have a main direction of extent which preferably lies in a radially oriented plane. The intermediate portion may have a main direction of extent which is preferably slightly inclined, preferably at less than 60°, less than 45° or less than 30°, in relation to a radially oriented plane. The intermediate portion may for example be of substantially annular disk-shaped form.

According to a preferred embodiment, it is provided that that portion of the bearing cover which is remote from the bearing and that portion thereof which is close to the bearing are connected to one another via the intermediate portion. It is preferably the case that a transition from the portion remote from the bearing to the intermediate portion is of rounded form. It is furthermore preferably the case that a transition from the portion close to the bearing to the intermediate portion is of rounded form. Such roundings may preferably have a rounding radius. The transition from the portion remote from the bearing to the intermediate portion is preferably rounded in a different direction than the transition from the portion close to the bearing to the intermediate portion. That portion of the bearing cover remote from the bearing and that portion thereof close to the bearing and the intermediate portion thereof may preferably be integrally formed. An integral formation is to be understood as meaning in particular a formation for which that portion of the bearing cover remote from the bearing and that portion thereof close to the bearing and the intermediate portion thereof are formed from a single piece, and in particular are not produced as separate components which are subsequently joined together.

In a further preferred embodiment, it is provided that the bearing cover is of annular form and/or has multiple part-ring segments which are preferably connected to one another. The part-ring segments are preferably connected or able to be connected to one another in a detachable manner.

This configuration has various advantages. Part-ring segments of a bearing cover can be transported and mounted in an easier and less expensive manner than a closed ring. Furthermore a design of the bearing cover with multiple part-ring segments makes it possible for only in each case one part-ring segment to be dismounted. This is advantageous for example for maintenance or repair of the bearing cover or of one or more elements covered by the latter.

A further preferred development is distinguished by the fact that the bearing cover, in particular via its portion remote from the bearing, is fastened, preferably in a detachable manner, to the outer circumferential surface of the hub-side end of the rotor blade.

Such a fastening to the outer circumferential surface of the hub-side end of the rotor blade has the advantage that the bearing cover is independent, in particular temporally independent, of the mounting of the rotor blade. A fastening of the bearing cover to the outer circumferential surface of the hub-side end of the rotor blade comprises for example also a fastening in which fastening elements engage into corresponding cutouts in the hub-side end of the rotor blade and are fastened for example at that portion of the bearing cover which is remote from the bearing, for example in corresponding holes of the bearing cover and by way of corresponding head elements of the fastening elements.

The hub-side end of the rotor blade preferably has at least one passage opening in a radial direction. It is preferably possible for provision to be made of multiple such radial passage openings, which may preferably be arranged spaced apart, in particular spaced apart equidistantly, in a circumferential direction.

Such passage openings may serve for receiving fastening elements for fastening the bearing cover. Such passage openings may however also be provided for providing access into the intermediate space between the outer circumferential surface of the hub-side end of the rotor blade and that portion of the bearing cover which is close to the bearing. Said intermediate space is preferably also accessible from the interior of the hub-side end of the rotor blade by way of the passage openings.

The passage opening is preferably configured to receive therethrough at least one functional element. Such a functional element may for example be a handling device and/or an inspection device. A handling device may comprise for example a lever, a gripper or the like. An inspection device may comprise for example one or more sensors and/or lines connected to the latter. The sensors may for example be optical, thermal, acoustic or some other types of sensors. An inspection device may comprise for example a measuring device, which comprises in particular a measurement element and/or a measurement line.

In this way, it is possible to be able to inspect elements situated in the intermediate space, such as for example a screw fitting for fastening of the fixed part of the blade bearing, in particular heads of the blade fastening bolt. Preferably, for this purpose, it is possible to dismount the bearing cover completely or partially, in particular to dismount one or more of its part-ring segments, beforehand. The passage opening used for inspection purposes may be identical to a passage opening serving for fastening of the bearing cover. The passage opening used for inspection purposes may however also be an additional passage opening which is provided separately for inspection.

It is furthermore preferably provided that, in the region of the fastening of the bearing cover on the outer circumferential surface of the hub-side end of the rotor blade, there are arranged compensation elements, for example in the form of shims.

The provision of compensation elements serves in particular for making it possible for any deviations of the outer circumferential surface of the hub-side end of the rotor blade from a circular line to be compensated. The compensation elements may have for example different dimensions, in particular in a direction which is radial in the operating state, so as to be able to compensate for different deviations from a circular line. In this way, the bearing cover, in particular that portion thereof which is remote from the bearing, may be of annular form without assembly- or tolerance-related problems occurring, since any deviations from a circular line can be compensated via the compensation elements.

Furthermore, it is in particular preferable for provision to be made of a sealing element which at least partially seals off and/or covers a gap between the outer circumferential surface of the hub-side end of the rotor blade and that portion of the bearing cover which is remote from the bearing.

Such a sealing element can preferably reduce ingress of, for example, dirt and moisture into the gap between the outer circumferential surface of the hub-side end of the rotor blade and that portion of the bearing cover which is remote from the bearing and/or into the intermediate space. A liquid-tight seal may also be provided.

In a further preferred embodiment, it is provided that the fixed part of the blade bearing is formed as a nose ring and the movable part of the blade bearing is formed as a U-ring, in particular as a split U-ring. A further preferred development is distinguished by the fact that the movable part of the blade bearing is formed as a nose ring and the fixed part of the blade bearing is formed as a U-ring, in particular as a split U-ring.

The described bearing cover of a rotor blade can preferably be used irrespective of whether the fixed part of the blade bearing is formed as a nose ring or the movable part of the blade bearing is formed as a nose ring.

Further advantageous embodiment variants of the above-described rotor blade are obtained by combining the preferred features discussed here.

According to a further aspect of the invention, the object stated in the introduction is achieved by a rotor for a wind power installation, comprising a hub which has a blade bearing and has a rotor blade as described above, which rotor blade is fastened to the blade bearing.

In a preferred embodiment of the rotor, it is provided that the hub has a radially inwardly projecting flange at the end close to the bearing, wherein the flange preferably has a circumferentially extending slot as access to blade fastening bolts by which the rotor blade is fastened to the movable part of the bearing.

The hub furthermore preferably has at the end close to the bearing a plurality of hub blind holes for receiving bearing fastening bolts for fastening a fixed part of a blade bearing to the hub.

Provision is furthermore preferably made of an arresting device by which the rotor blade can be arrested in relation to the hub, in particular so as to prevent a rotational movement of the rotor blade in relation to the hub, this being advantageous for example in the case of a pitch motor being exchanged or repaired. The arresting device preferably has an arresting pin.

The arresting pin, in particular a fastening end of the arresting pin, is preferably configured to engage with a blade fastening bolt, in particular the head of a blade fastening bolt. This engagement may for example be form-fitting and/or force-fitting and/or frictional engagement. The engagement may be configured for example as a preferably detachable threaded connection. In particular, the engagement is preferably configured to prevent a radial relative movement between the arresting pin and the blade fastening bolt. The arresting pin may preferably have at its fastening end a cutout, for example in the form of an arresting blind hole, which may preferably be provided with a thread. If the blade fastening bolt is in the form of a threaded bolt, the thread in the cutout of the arresting pin is preferably formed so as to match the thread of the blade fastening bolt, so that these are able to come into engagement with one another.

Furthermore, the arresting pin, in particular a slot end of the arresting pin, is preferably configured to come into engagement with the slot. This engagement may for example be form-fitting and/or force-fitting and/or frictional engagement. The engagement may be configured for example as a preferably detachable threaded connection. For this purpose, a slot insert may be provided. At its slot end, the arresting pin may preferably have a bar projection which is able to come into engagement with a fastening element.

According to a further aspect of the invention, provided is a wind power installation having an above-described rotor blade and/or having an above-described rotor.

According to a further aspect of the invention, provided is a method for connection of a rotor blade at a hub of a rotor of a wind power installation, comprising: provision of an above-described rotor blade, and fastening of the hub-side end of the rotor blade to a blade bearing arranged on the hub.

A preferred embodiment of the method is characterized by pretensioning, in particular hydraulic pretensioning, of the blade fastening bolts, screwing of nuts onto the blade fastening bolts, and partial release of tension of the blade fastening bolts, wherein the pretensioning and/or screwing-on and/or release of tension are preferably realized through a circumferentially extending slot of a radially inwardly projecting flange at an end of the hub that is close to the bearing. The pretensioning may preferably be realized in that the blade fastening bolts are pulled out in particular through the slots. Due to the partial release of tension, a pretension remains in the blade fastening bolts, the latter being influenced in particular by the tension-release path, which is predefined in particular by the position of the screwed-on nuts.

These further aspects and possible developments thereof have features or method steps which make them particularly suitable to be used for a rotor blade according to the invention and developments thereof. With regard to the advantages, embodiment variants and embodiment details of these further aspects of the invention and developments thereof, reference is made to the foregoing description pertaining to the corresponding features of the in each case other aspects.

BRIEF DESCRIPTION OF THE SEVERAL VIEWS OF THE DRAWINGS

Preferred exemplary embodiments will be described by way of example on the basis of the appended figures. In the figures.

In the figures, identical or substantially functionally identical elements are denoted by the same reference signs. General descriptions relate as a rule to all the embodiments, provided that differences are not explicitly specified.

DETAILED DESCRIPTION

Figure 1:
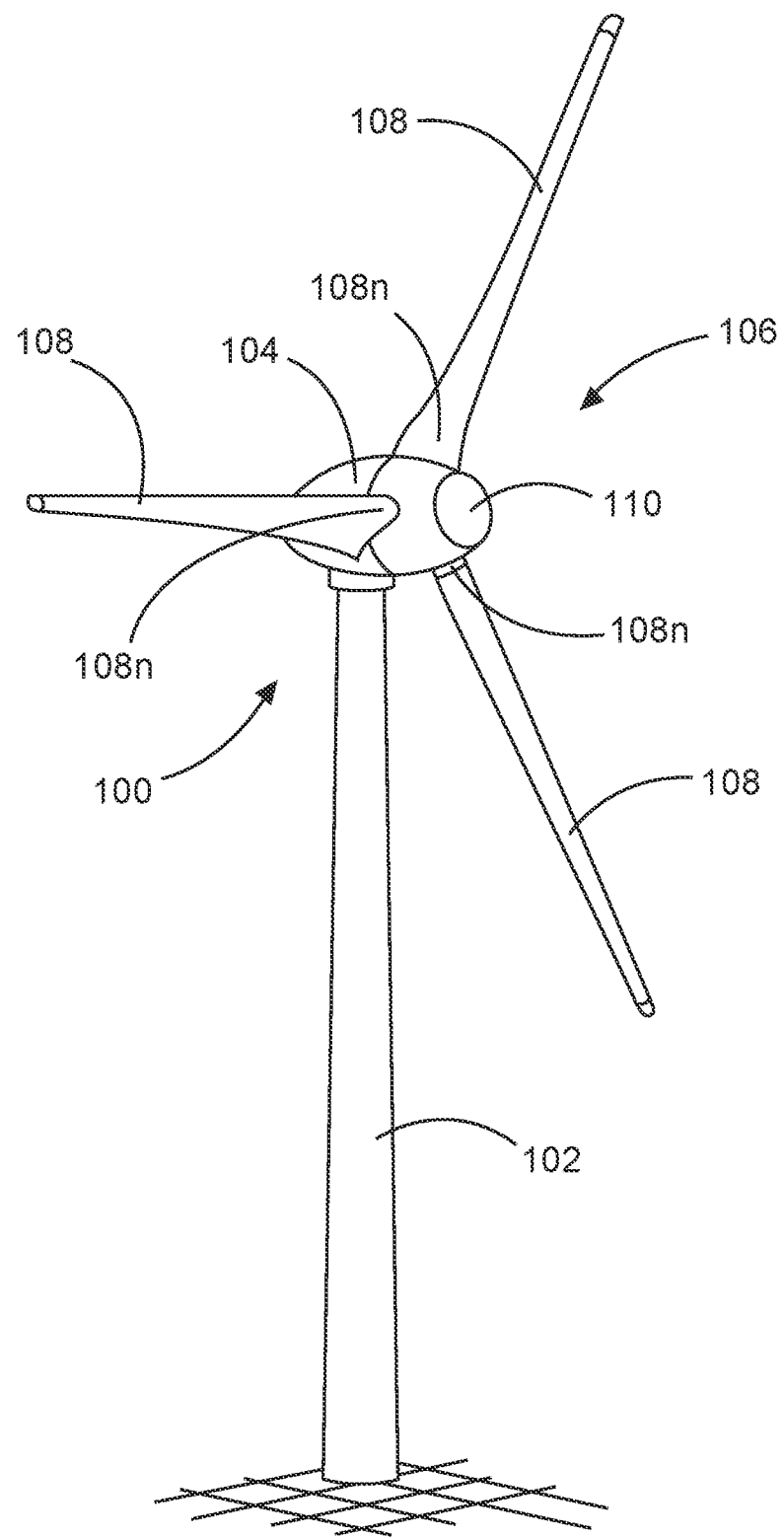
FIG. 1 shows a schematic illustration of a wind power installation.
Figure 2:
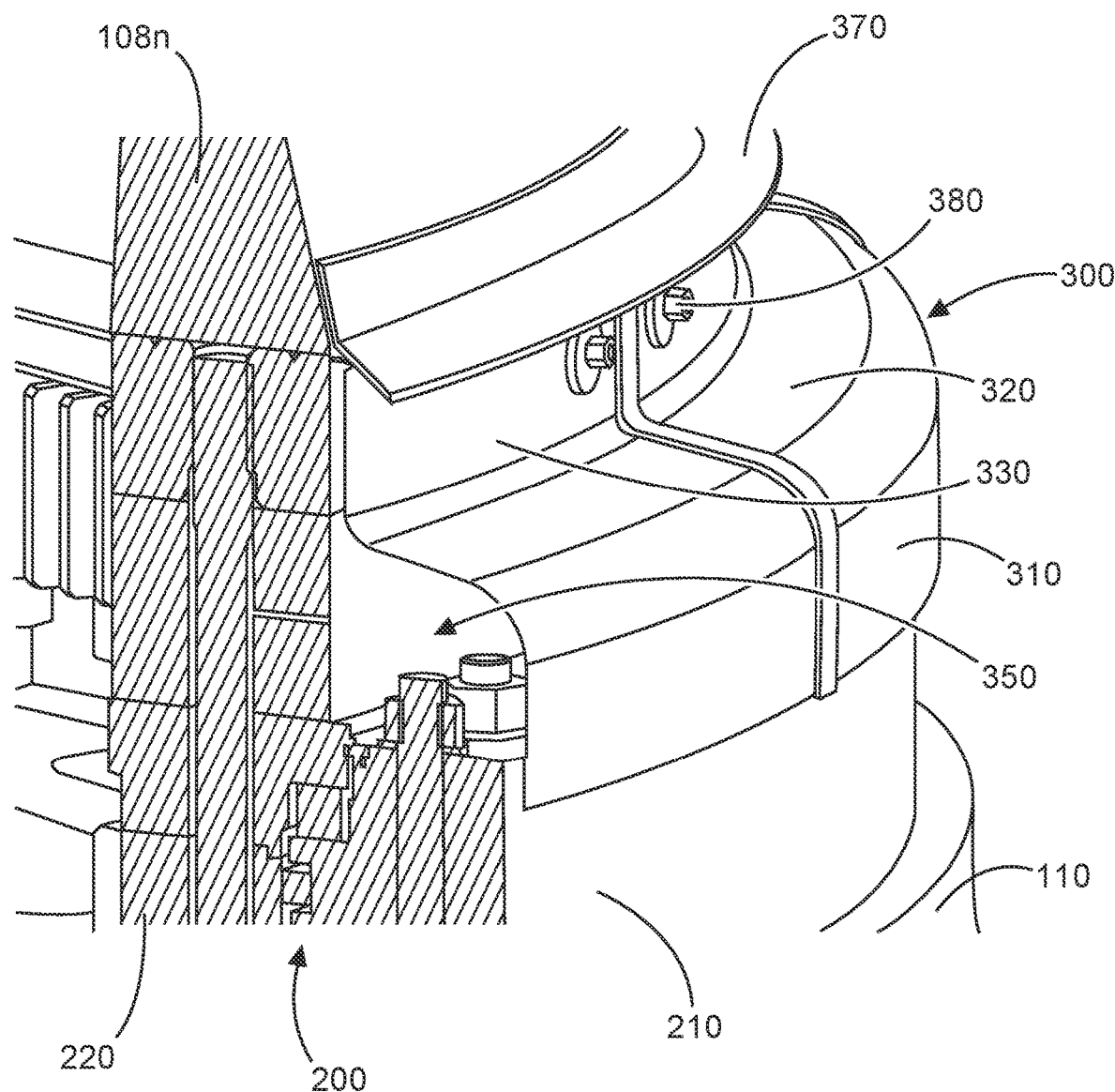
FIG. 2 shows a three-dimensional sectioned illustration of a detail of a rotor blade fastened to the bearing.
Figure 3:
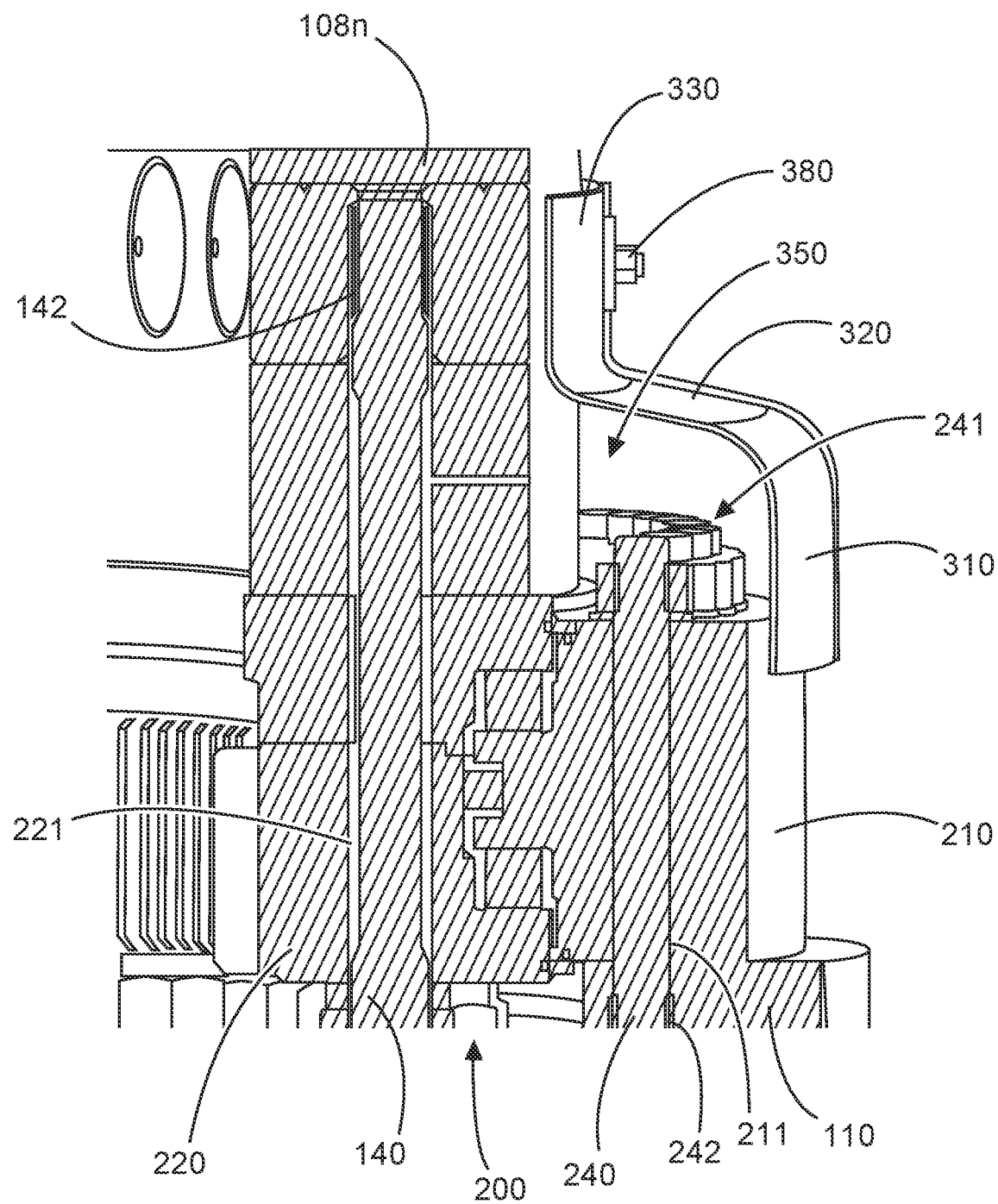
FIG. 3 shows a further three-dimensional sectioned illustration of a detail of a rotor blade fastened to the bearing.
Figure 4:
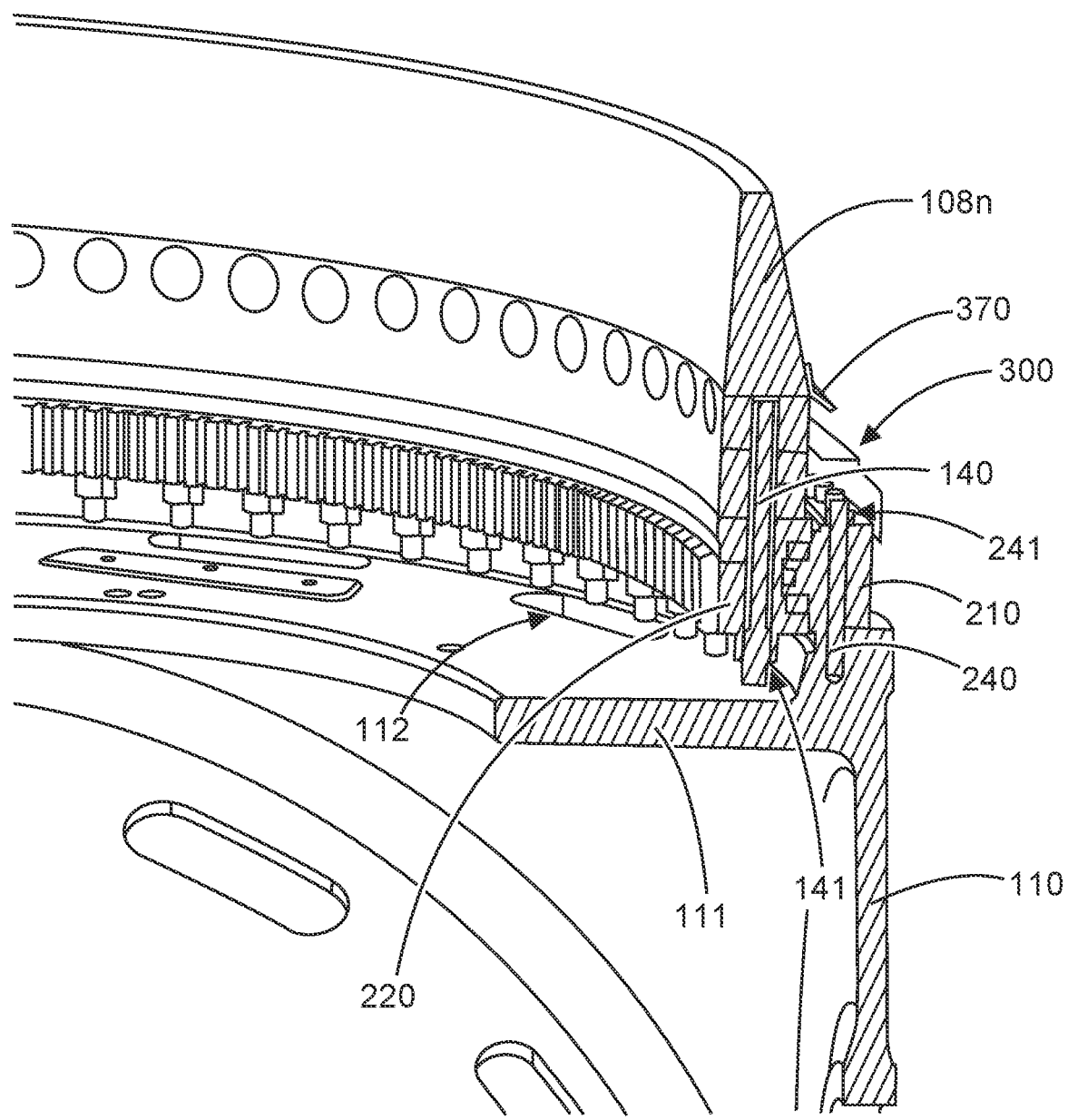
FIG. 4 shows a further three-dimensional sectioned illustration of a detail of the fastening of a rotor blade to a hub.

FIG. 1 shows a schematic illustration of a wind power illustration according to the invention. The wind power installation 100 has a tower 102 and a nacelle 104 on the tower 102. An aerodynamic rotor 106 having three rotor blades 108 and having a hub 110 is provided on the nacelle 104. During the operation of the wind power installation, the aerodynamic rotor 106 is set in rotational motion by the wind and thereby also rotates an electrodynamic rotor or runner of a generator, which is coupled directly or indirectly to the aerodynamic rotor 106. The electric generator is arranged in the nacelle 104 and generates electrical energy. The pitch angles of the rotor blades 108 can be varied by pitch motors at the rotor blade roots of the respective rotor blades 108.

Figure 7:
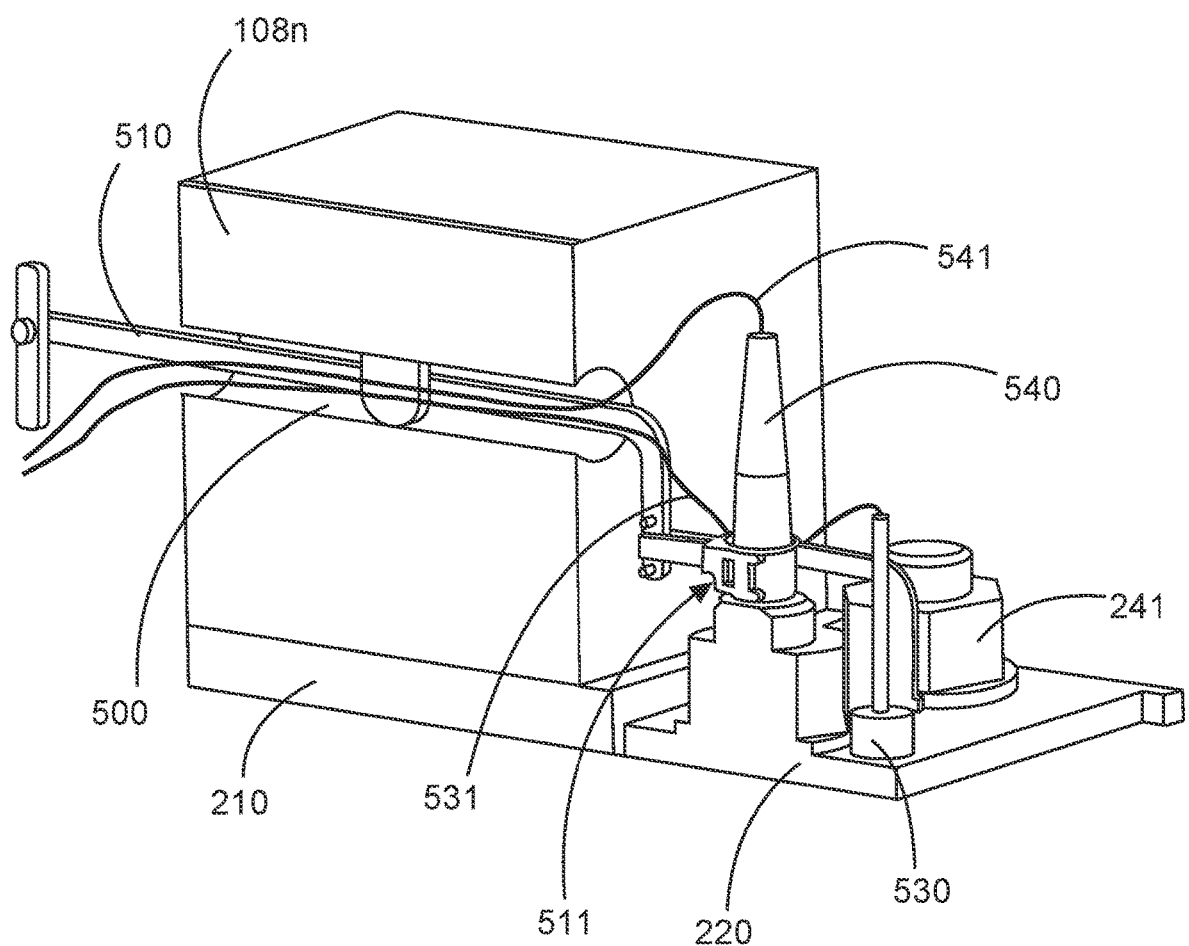
FIG. 7 shows a schematic three-dimensional sectioned illustration of a detail of a hub-side end of the rotor blade with a blade bearing.
Figure 8:
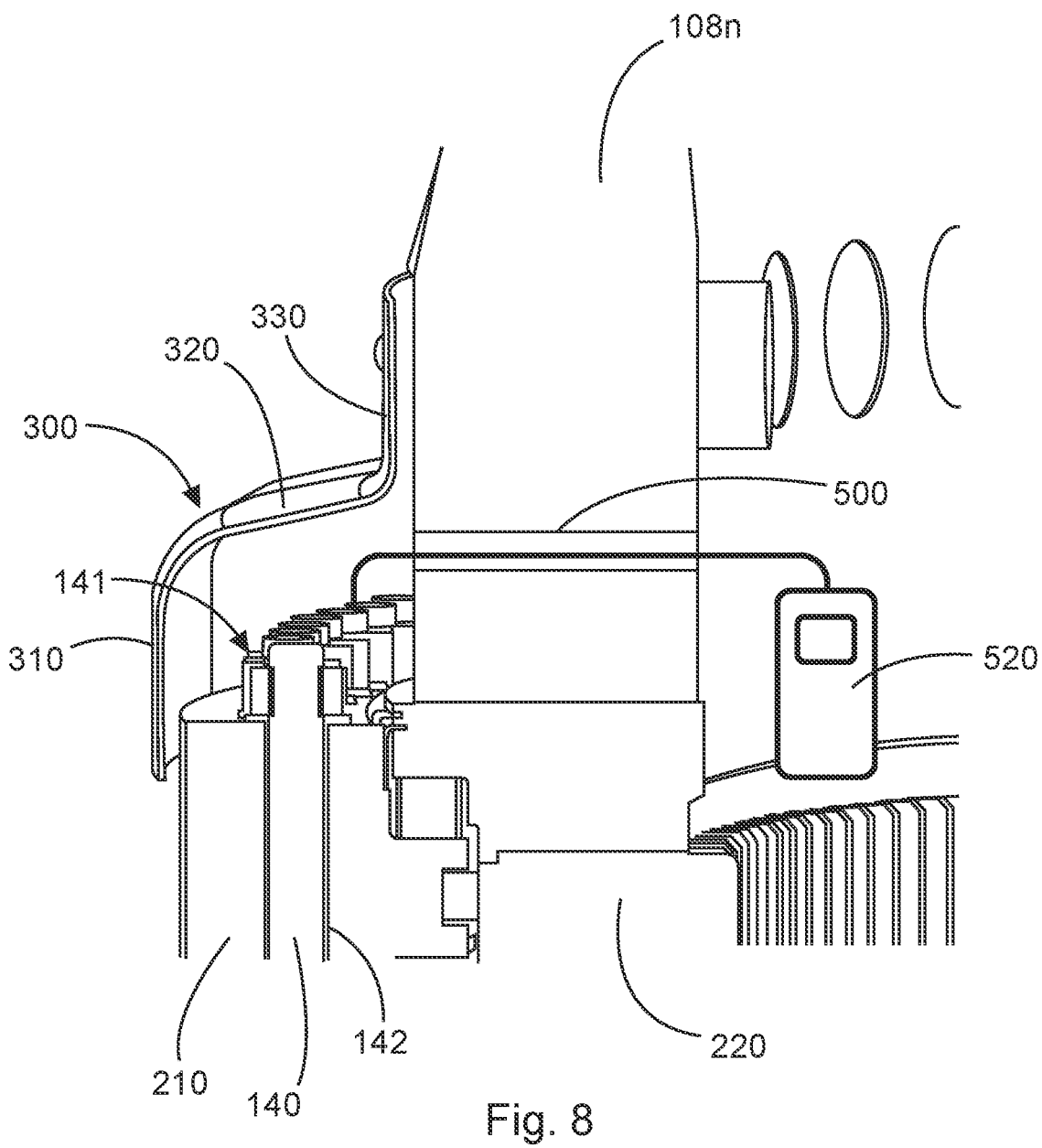
FIG. 8 shows a further schematic three-dimensional sectioned illustration of a detail of a hub-side end of the rotor blade with a blade bearing.
Figure 9:
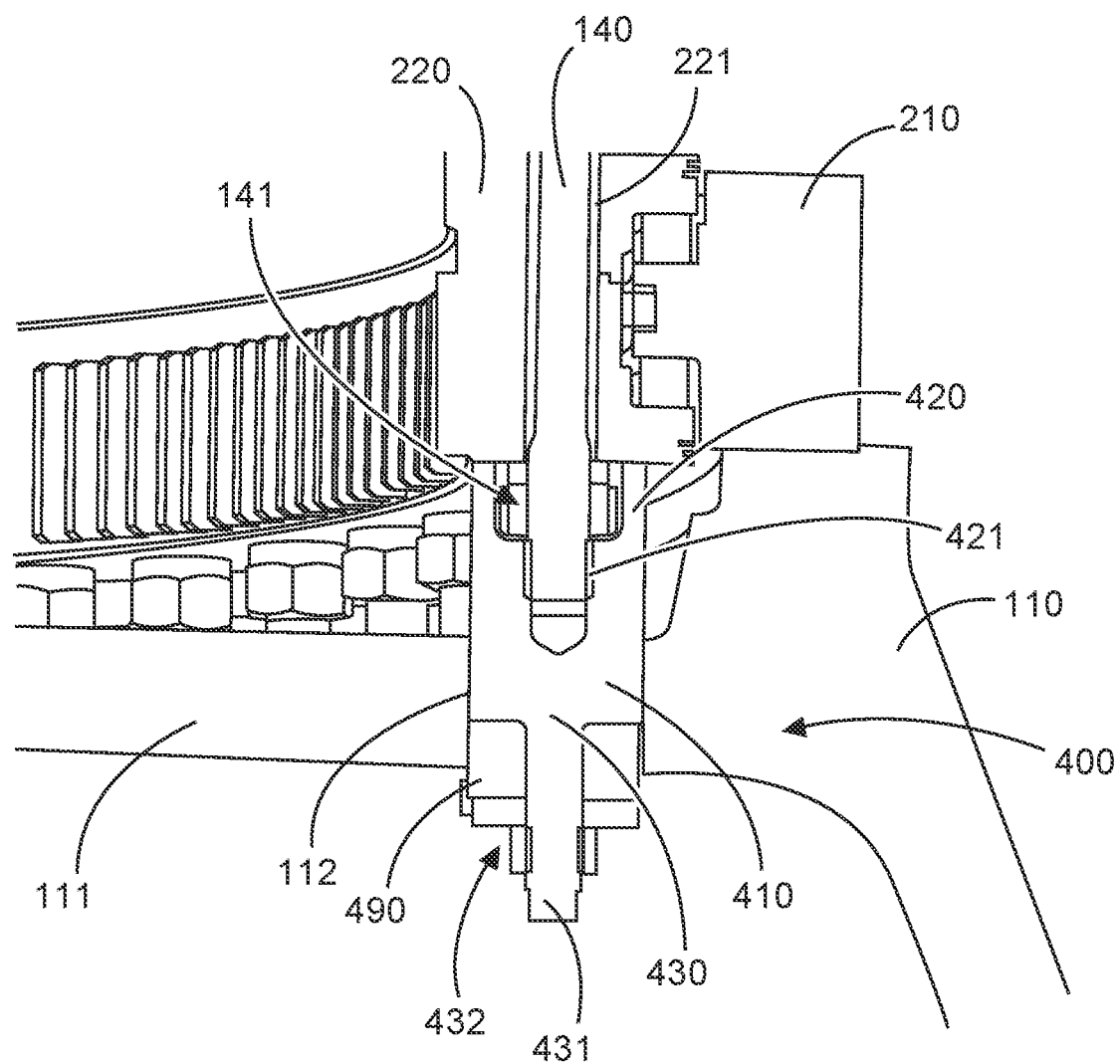
FIG. 9 shows a three-dimensional sectioned illustration of an arresting device for arresting the rotor blade in relation to the hub.
Figure 10:
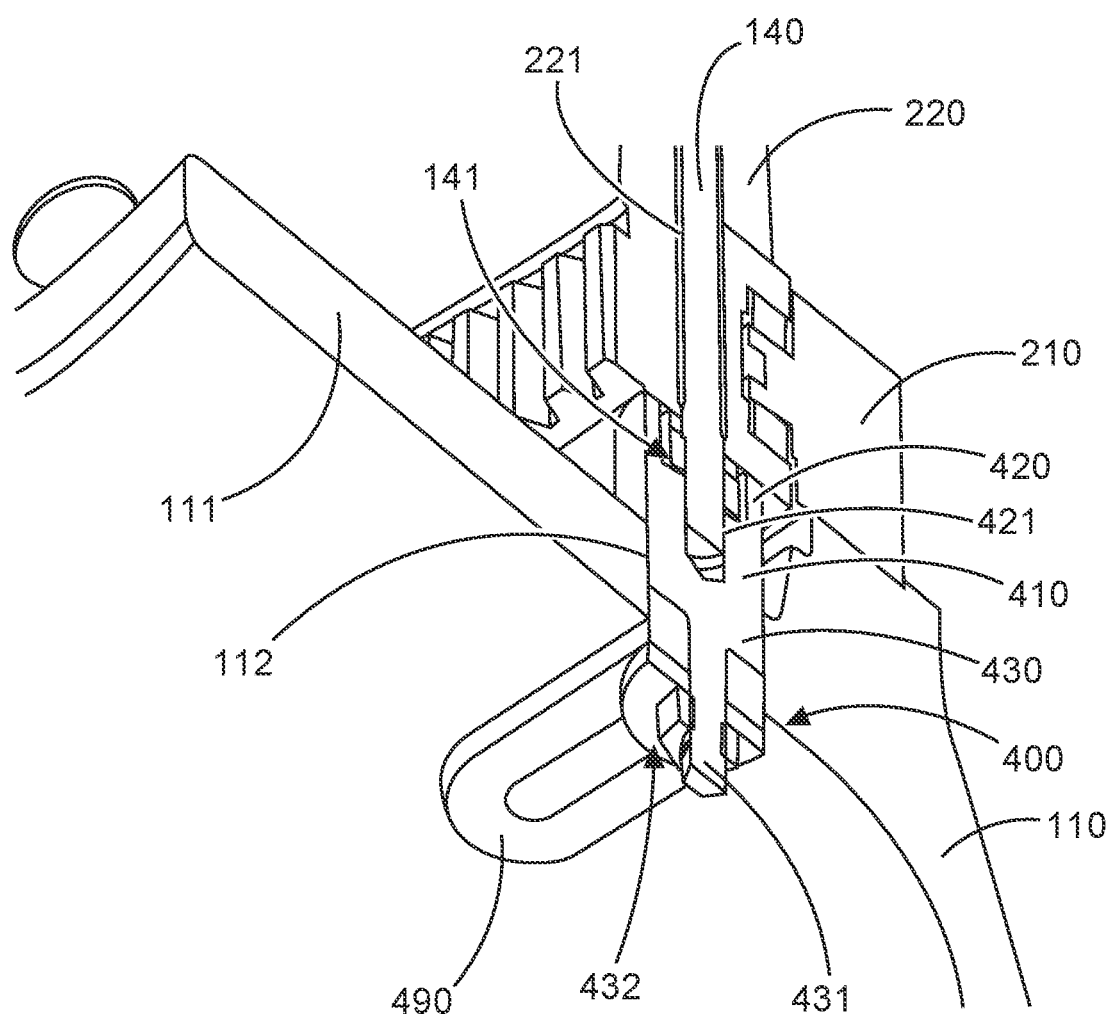
FIG. 10 shows a further three-dimensional sectioned illustration of an arresting device for arresting the rotor blade in relation to the hub.
Figure 11:
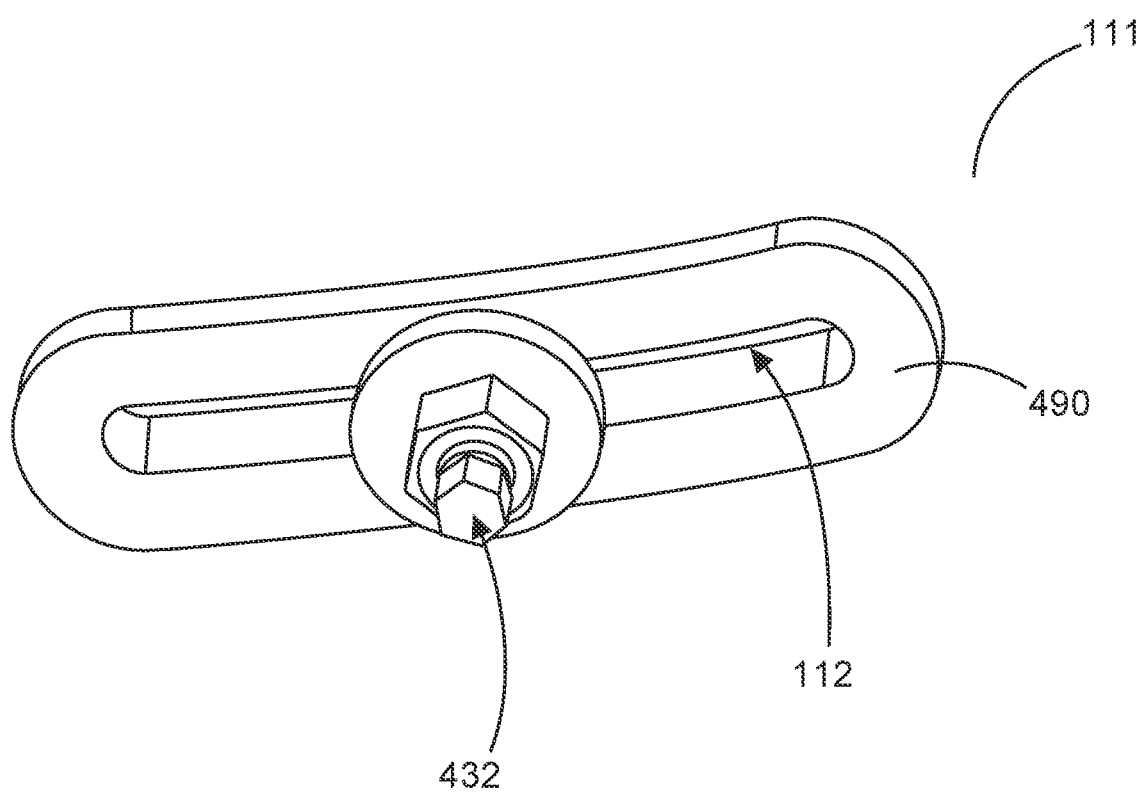
FIG. 11 shows a three-dimensional illustration of the fastening element of the arresting pin and the slot insert.

The rotor blades 108 are fastened to the hub 110 via a blade bearing 200. A bearing cover 300 protects this region from environmental influences. Details of the fastening of the rotor blade 108 to the hub 110 and of the blade bearing 200 and the bearing cover 300 will be described in more detail below, in particular with reference to FIGS. 2 to 6 and FIG. 12. FIGS. 7 and 8 illustrate further details of a possible way of inspecting the bearing. FIGS. 9 to 11 illustrate details of an arresting device 400 for arresting the rotor blade 108 in relation to the hub 110.

Figure 14:
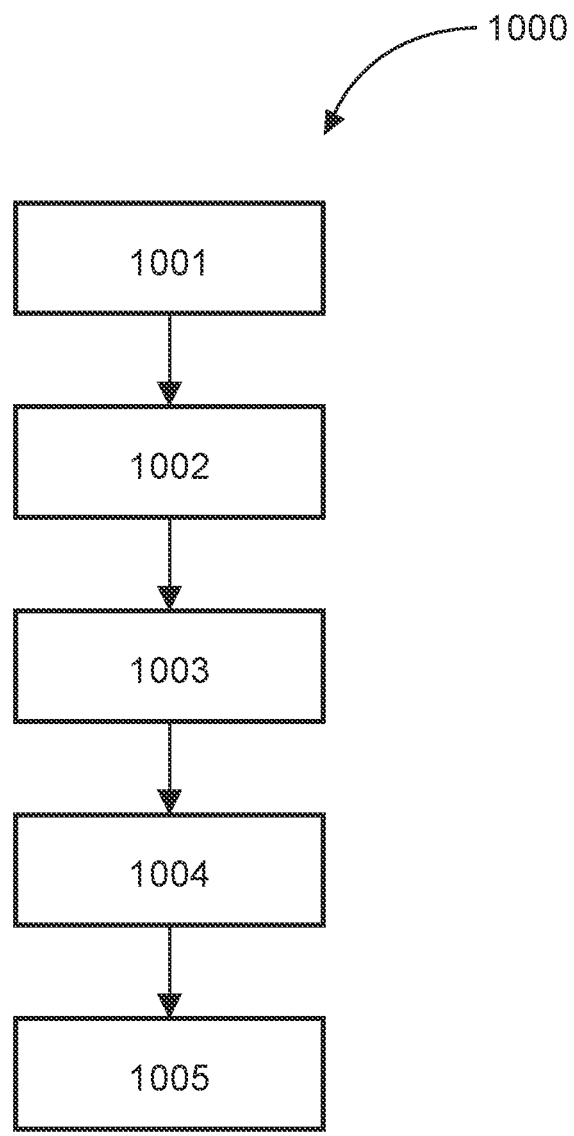
FIG. 14 shows a schematic illustration of a method for connection of a rotor blade at a hub of a rotor of a wind power installation.

Finally, FIG. 14 schematically shows the steps of a method 1000 for connection of a rotor blade 108 at a hub 110 of a rotor 106 of a wind power installation 100.

A rotor blade 108 is fastened by way of its hub-side end 108n to the hub 110 of a rotor 106 of a wind power installation 100. The rotor blade fastening described here may equally be used for hubs which, for fastening the rotor blade 108, have a hub adapter.

The fastening of the rotor blade 108 to the hub 110 is realized via a blade bearing 200. The blade bearing 200 comprises a fixed part 210 and a movable part 220. The fixed part 210 of the blade bearing 200 is fastened to the hub 110 by means of a plurality of bearing fastening bolts 240. Said bearing fastening bolts 240 engage through corresponding passage holes 211 in the fixed part 210 of the blade bearing 200 and end in corresponding hub blind holes 242 of the hub 110. As will be described in more detail below, the heads 241 of the bearing fastening bolts 240 project into the intermediate space 350 of the bearing cover 300 and are thus protected from environmental influences.

The hub-side end 108n of the rotor blade 108 is fastened to the movable part 220 of the blade bearing 200 by means of a plurality of blade fastening bolts 140. The blade fastening bolts 140 pass through corresponding passage holes 221 in the movable part 220 of the blade bearing 200 and end in corresponding blade blind holes 142 in the rotor blade 108. The heads 141 of the blade fastening bolts 140 are accessible via slots 112 in the radially projecting flange 111 of the hub 110.

Preferably, for pretensioning, the blade fastening bolts 140 are pulled a small distance out of the passage holes 221 in the movable part 220 of the blade bearing 200 under hydraulic action and then the nuts of the heads 141 of the blade fastening bolts 140 are screwed on. The hydraulic tension is then released, resulting in a firmly braced blade fastening. In this way, it is preferably also the case that torque limitation during attachment of the nuts on the heads 141 of the blade fastening bolts 140 may be omitted.

Figure 12:
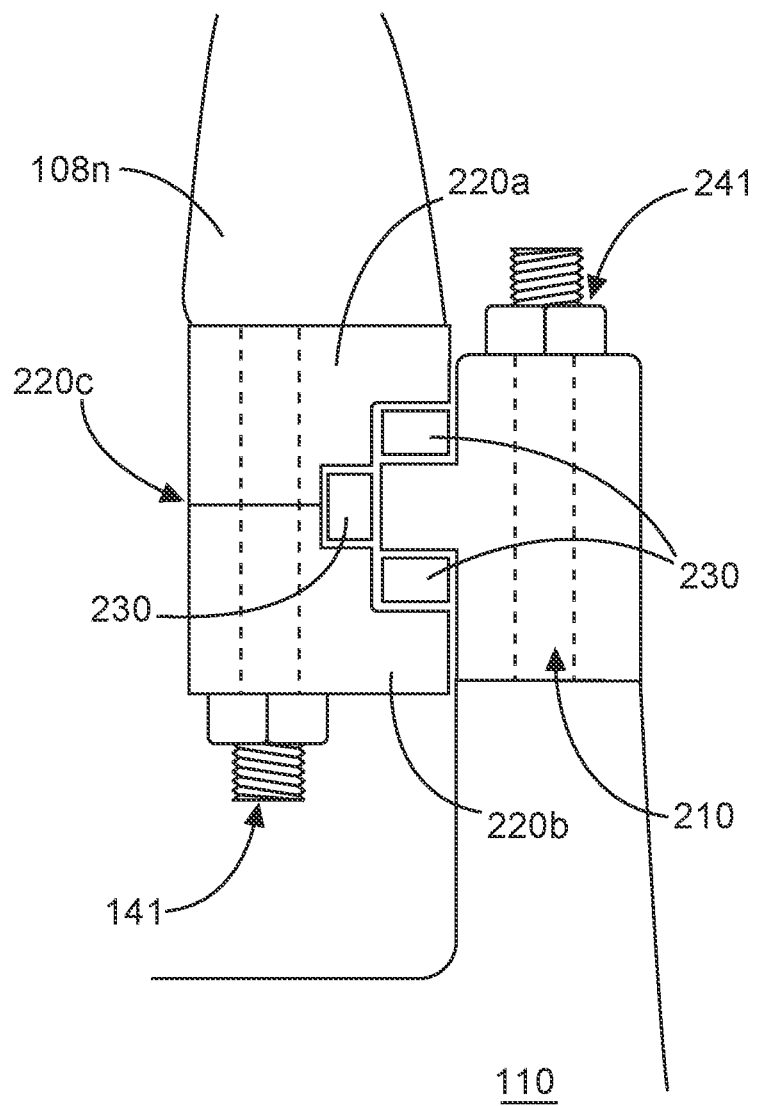
FIG. 12 shows a further schematic sectioned illustration of a detail of a hub-side end of the rotor blade with a blade bearing.

FIG. 12 shows the movable part 220 of the blade bearing as a split inner ring having an upper part 220a and a lower part 220b and the parting 220c. The rolling bodies 230, in the form of rollers here, can also be seen in FIG. 12.

In the examples illustrated here, the fixed part 210 of the blade bearing 200 is formed as a so-called nose ring and the movable part 220 of the blade bearing 200 is formed as a split U-ring. A reverse design, in which the fixed part 210 of the blade bearing 200 is formed as a split U-ring and the movable part 220 of the blade bearing 200 is formed as a nose ring, is also possible.

A bearing cover 300 is arranged on an outer circumferential surface 108u of the hub-side end 108n of the rotor blade 108.

The bearing cover 300 serves in particular for protecting, for example from environmental influences, that region of the connection between the rotor blade 108 and the hub 110 which is covered by said bearing cover and, for example, for reducing the ingress of rain and/or dirt. This is advantageous in particular for wind power installations 100 whose rotor 106 has no spinner.

In order to further increase the protective action, provision is preferably made of a sealing element 370 which at least partially seals off and/or covers a gap between the outer circumferential surface 108u of the hub-side end 108n of the rotor blade 108 and that portion 330 of the bearing cover 300 which is remote from the bearing. In this way, the ingress of, for example, dirt and moisture into the gap can be reduced. Provision may also be made of a seal which is liquid-tight, that is to say not only reduces the ingress of liquid.

The bearing cover 300 comprises a portion 310 close to the bearing and a portion 330 remote from the bearing. The portion 310 close to the bearing is further away from the outer circumferential surface 108u of the hub-side end 108n of the rotor blade 108 than the portion 330 remote from the bearing by a multiple. An intermediate space 350 is formed between the outer circumferential surface 108u of the hub-side end 108n of the rotor blade 108 and that portion 310 of the bearing cover 300 which is close to the bearing. Said intermediate space serves in particular for accommodating a portion of a fixed part 210 of the blade bearing 220, in particular for accommodating the heads 241 of the bearing fastening bolts 240. In particular, it is preferable that the bearing cover 300, in particular the intermediate space 350 thereof, is arranged and configured for accommodating the heads 241 of the bearing fastening bolts 240.

That portion 330 of the bearing cover which is remote from the bearing and that portion 310 thereof which is close to the bearing are preferably arranged substantially parallel to one another and/or radially spaced apart from one another. Preferably, that portion 330 of the bearing cover 300 which is remote from the bearing and that portion 310 thereof which is close to the bearing extend substantially in the direction of the longitudinal axis of the rotor blade.

It is furthermore preferable for the bearing cover 300 to have an intermediate portion 320 which is arranged between the portion 330 remote from the bearing and the portion 310 close to the bearing. In the example shown here, the intermediate portion 320 has a main direction of extent which is slightly inclined in relation to a radially oriented plane. Furthermore, the intermediate portion 320 is of annular disk-shaped form. The intermediate portion 320 connects the portion 330 remote from the bearing to the portion 310 close to the bearing, the transitions from the portion 330 remote from the bearing to the intermediate portion 320 and from the portion 310 close to the bearing to the intermediate portion 320 being of rounded form. The transition from the portion 330 remote from the bearing to the intermediate portion 320 is rounded in a different direction than the transition from the portion 310 close to the bearing to the intermediate portion 320.

The portion 330 remote from the bearing, the portion 310 close to the bearing and the intermediate portion 320 are integrally formed and formed from a single piece.

Figure 5:
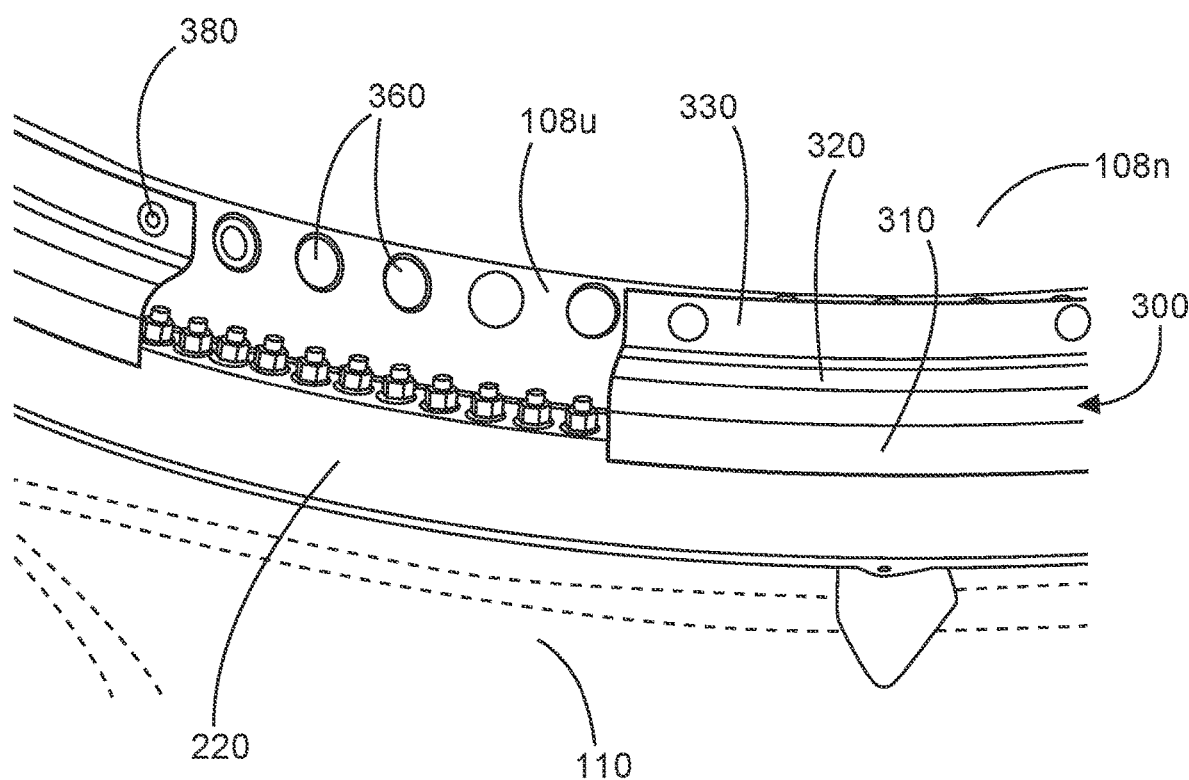
FIG. 5 shows a three-dimensional illustration of a bearing cover, with a part-ring segment removed.
Figure 6:
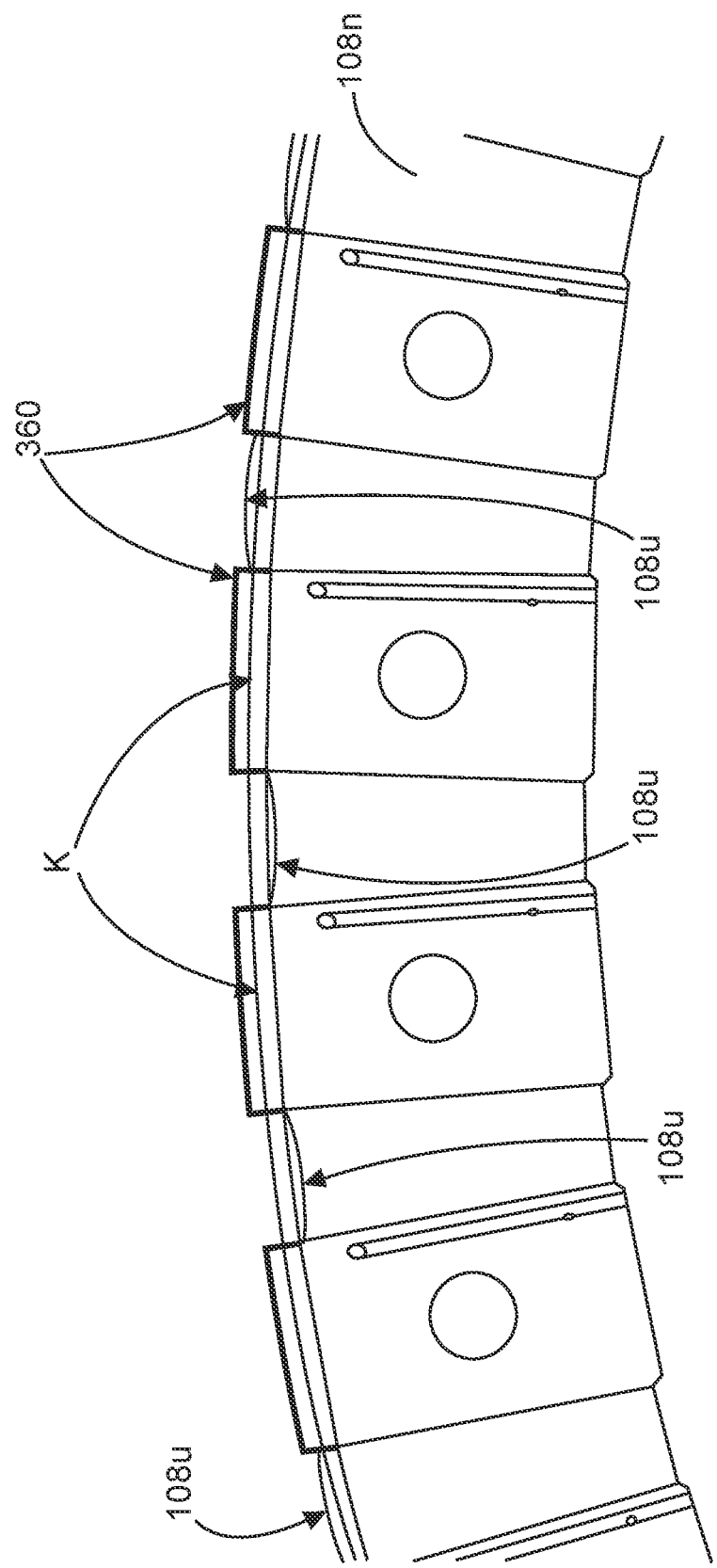
FIG. 6 shows a schematic sectional illustration of a part of a hub-side end of the rotor blade.

As can be seen in particular in FIG. 5, the bearing cover 300 has multiple part-ring segments. The altogether annular bearing cover 300 is thus preferably formed by multiple part-ring segments. The individual part-ring segments are preferably connected to one another in a detachable manner. Said connections may be plug connections, overlap connections or other connections. The integral formation of the portion 330 remote from the bearing, the portion 310 close to the bearing and the intermediate portion 320 consequently refers in particular to the formation of a respective part-ring segment.

The bearing cover 300, in particular via its portion 330 remote from the bearing, is fastened in a detachable manner to the outer circumferential surface 108u of the hub-side end 108n of the rotor blade 108, in particular by means of fastening elements 380 which may, for example, be passed through radial passage opening in the hub-side end 108n of the rotor blade 108 and corresponding cutouts in that portion 330 of the bearing cover 300 which is remote from the bearing.

In the region of the fastening of the bearing cover 300 on the outer circumferential surface 108u of the hub-side end 108n of the rotor blade 108, there may preferably be arranged at the ends 360 of the transverse bolts compensation elements, for example in the form of shims. By means of such compensation elements, it is possible in particular for any deviations of the outer circumferential surface 108u of the hub-side end 108n of the rotor blade 108 from a circular line K to be compensated. For this purpose, the compensation elements may preferably have different dimensions, for example different shim thicknesses, in order to be able to compensate for different deviations, for example inward or outward deviations, from the circular line K. Consequently, the bearing cover 300, in particular that portion 330 thereof which is remote from the bearing, may be of annular form, and any deviations in the outer circumferential surface 108u of the hub-side end 108n of the rotor blade 108 can be compensated via the compensation elements, as a result of which assembly- and tolerance-related problems can be avoided or reduced.

As can be seen in particular in FIGS. 7 and 8, radial passage openings 500 may be provided in the hub-side end 108n of the rotor blade 108. Said passage openings 500 may on the one hand serve for receiving the fastening elements 380 of the bearing cover 300. Such passage openings 500 may however in particular also be provided for allowing the access into the intermediate space 350 from the interior of the hub-side end 108n of the rotor blade 108. Said access into the intermediate space 350 and in particular to the heads 241, projecting in said intermediate space, of the bearing fastening bolts 240 is advantageous for inspection, maintenance or repair purposes. A passage opening 500 is therefore preferably configured to receive therethrough at least one functional element, in particular for example a handling device 510, having a gripper 511, and/or an inspection device 520, which may comprise for example a temperature sensor 530, having a corresponding line 531, and/or a measurement head 540, likewise having a corresponding line 541. Further or other sensors may also be provided. In this way, it is possible by means of the radial passage openings 500 for the intermediate space 350 to be made accessible so as to be able to inspect elements situated there. Preferably, for this purpose, the bearing cover 300 can be dismounted completely or partially beforehand. In particular, for this purpose, it is for example possible for a part-ring segment to be dismounted, as shown in FIG. 5.

Figure 13:
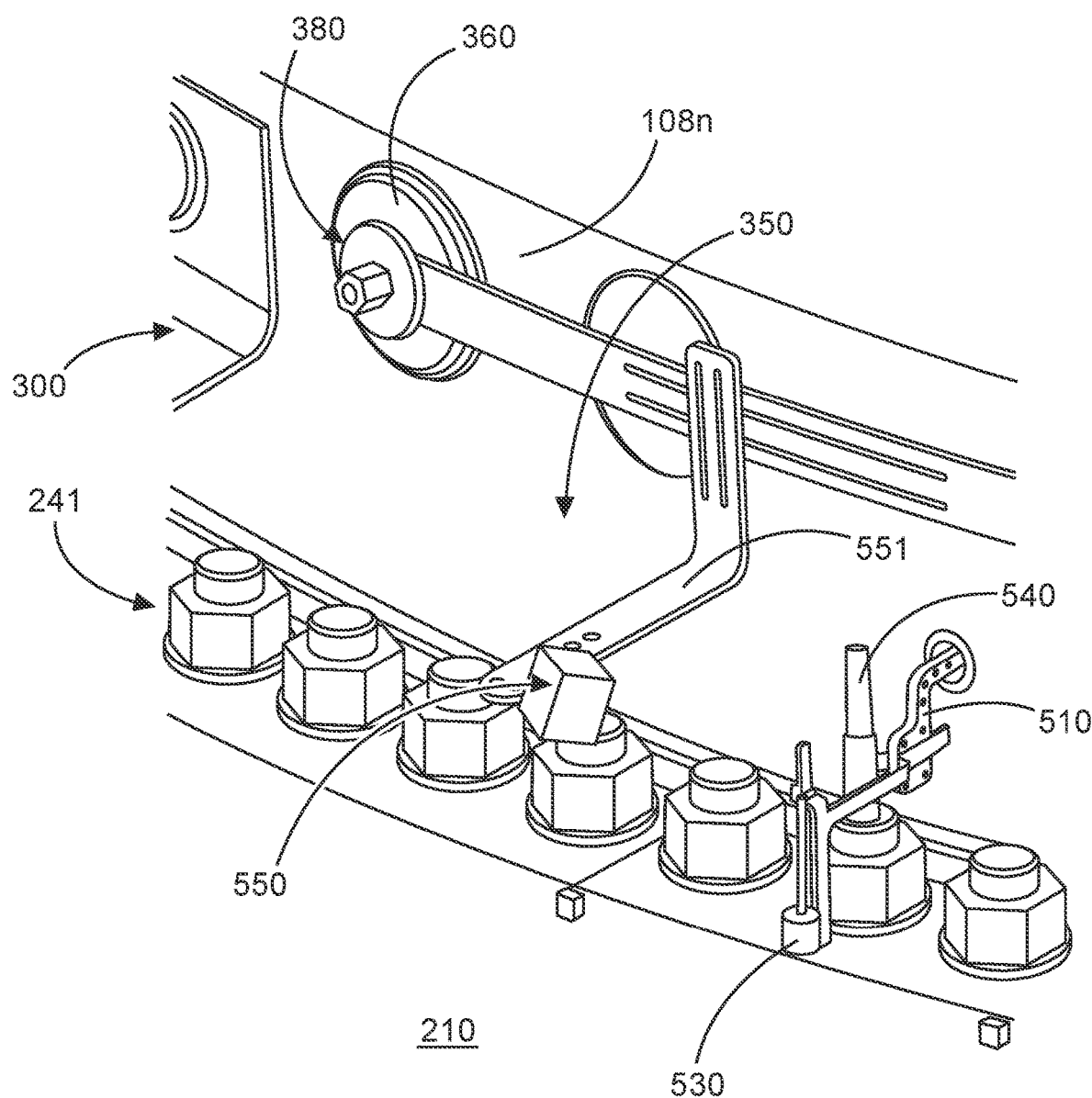
FIG. 13 shows a further schematic three-dimensional illustration of a detail of a hub-side end of the rotor blade with a blade bearing.

As can be seen in FIG. 13, it may be preferable for there to be arranged in the intermediate space 350, or with the bearing cover 300 completely or partially dismounted, a camera 550 by way of which, for example, the handling device 510 and/or the gripper 511 and/or the inspection device 520 can be graphically captured. This can facilitate for example the control and/or monitoring of the handling device 510 and/or the gripper 511 and/or the inspection device 520.

A further advantage of the design of the bearing cover 300 in multiple part-ring segments is that the part-ring segments can also be transported and mounted in an easier and less expensive manner than a closed ring.

As illustrated in particular in FIGS. 9 to 11, provision is made of a preferably detachable or temporarily attachable arresting device 400, by way of which the rotor blade 108 can be arrested in relation to the hub 110. This may be required for example to prevent a rotational movement of the rotor blade 108 in relation to the hub 110, for example for the purpose of exchanging or repairing a pitch motor. The arresting device 400 has an arresting pin 410 on whose fastening end 420 a cutout 421 is provided. In this way, the arresting pin 410 can engage with the head 141 of a blade fastening bolt 140, for example via a threaded connection.

Provided at a slot end 430 of the arresting pin 410 is a bar projection 431 to which a fastening element 432 can be attached. For fastening the bar projection 431 in the slot 112 of the flange 111 of the hub 110, provision is made of a slot insert 490, the bar projection 431 of the arresting pin 410 being able to project therethrough and then being able to be fastened by the fastening element 432. This engagement may also be configured for example as a detachable threaded connection.

The arresting device 400 consequently makes it possible for the rotor blade 108 to be arrested in relation to the hub 110. This makes it possible to prevent in particular rotational movements of the rotor blade 108 in relation to the hub 110. If appropriate, an axial movement of the rotor blade 108 in relation to the hub 110 can additionally also be prevented.

The method 1000 illustrated in FIG. 14 for connection of a rotor blade 108 of the hub 110 of a rotor 106 of a wind power installation 100 begins with provision 1001 of a corresponding rotor blade 108, and then fastening 1002 of the hub-side end 108n of the rotor blade 108 to a blade bearing 200 arranged on the hub 110. Preferably, there occurs in this case pretensioning 1003, in particular hydraulic pretensioning, of the blade fastening bolts 140 through the slot 112 in the flange 111 of the hub 110, followed by screwing 1004 of nuts onto the heads 141 of the blade fastening bolts 140, and subsequent partial release of tension 1005 of the blade fastening bolts 140.

Overall, the solution described here provides a simple and inexpensive solution for connection of a rotor blade at the hub that, by way of the bearing cover provided, ensures a secure and reliable connection and is at the same time assembly- and service-friendly.

LIST OF REFERENCE SIGNS

100 Wind power installation
106 Rotor
108 Rotor blade
108n Hub-side end of the rotor blade
108u Outer circumferential surface of the hub-side end of the rotor blade
110 Hub
111 Flange
112 Slot
140 Blade fastening bolt
141 Head of the blade fastening bolt
142 Blade blind hole
200 Blade bearing
210 Fixed part of the blade bearing (outer ring)
211 Passage hole in the fixed part of the blade bearing
220 Movable part of the blade bearing (inner ring)
220a Upper part of a split, movable part of the blade bearing
220b Lower part of a split, movable part of the blade bearing
220c Parting of a split, movable part of the blade bearing
221 Passage hole in the movable part of the blade bearing
230 Rolling body
240 Bearing fastening bolt
241 Head of the bearing fastening bolt
242 Hub blind hole
300 Bearing cover
310 Portion of the bearing cover close to the bearing
320 Intermediate portion of the bearing cover
330 Portion of the bearing cover remote from the bearing
350 Intermediate space
360 Ends of the transverse bolts
370 Sealing element
380 Fastening element of the bearing cover
400 Arresting device
410 Arresting pin
420 Fastening end of the arresting pin
421 Cutout at the fastening end of the arresting pin
430 Slot end of the arresting pin
431 Bar projection at the slot end of the arresting pin
432 Fastening element for bar projection at the slot end of the arresting pin
490 Slot insert
500 Radial passage opening in the hub-side end of the rotor blade
510 Handling device
511 Gripper of the handling device
520 Inspection device
530 Temperature sensor
531 Line of temperature sensor
540 Measurement head
541 Line of measurement head
550 Camera
551 Holding means
1000 Method for connection of a rotor blade at a hub of a rotor of a wind power installation
1001 Provision of a rotor blade according to the invention
1002 Fastening of the hub-side end of the rotor blade to a blade bearing arranged on the hub
1003 Pretensioning, in particular hydraulic pretensioning, of the fastening bolts for fastening the rotor blade to a movable part of a blade bearing
1004 Screwing of nuts onto the fastening bolts
1005 Release of tension of the fastening bolts
K Circular line The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for connecting a rotor blade at a hub of a rotor of a wind power installation, comprising:
fastening of a hub-side end of the rotor blade to a blade bearing arranged on the hub, wherein the rotor blade comprises a bearing cover arranged on an outer circumferential surface of the hub-side end of the rotor blade, and wherein a portion of the bearing cover that is close to the blade bearing is away from the outer circumferential surface of the hub-side end of the rotor blade by a first amount, wherein a portion of the bearing cover that is remote from the blade bearing is away from the outer circumferential surface of the hub-side end of the rotor blade by a second amount, wherein the first amount is greater than the second amount by a multiple,
pretensioning blade fastening bolts,
screwing nuts onto the blade fastening bolts, and
partial release of tension of the blade fastening bolts,
wherein the pretensioning, screwing, and partial release of tension are realized through a circumferentially extending slot of a radially inwardly projecting flange at an end of the hub that is close to the blade bearing,
wherein an access into an intermediate space is provided between the outer circumferential surface of the hub-side end of the rotor blade and the portion of the bearing cover that is close to the blade bearing for inspection, maintenance, or repair purposes, receiving at least one functional element through a passage opening in a radial direction at the hub-side end of the rotor blade, and inspecting elements that are situated in the intermediate space between the outer circumferential surface of the hub-side end of the rotor blade and the portion of the bearing cover that is close to the blade bearing.

2. The method as claimed in claim 1, comprising arresting the rotor blade in relation to the hub to prevent a rotational movement of the rotor blade relative to the hub, and wherein arresting comprises using an arresting device having an arresting pin, wherein the arresting pin is configured to engage with a blade fastening bolt.

3. The method as claimed in claim 1, wherein the rotor is on a tower of the wind power installation.

4. The method as claimed in claim 1, receiving the at least one functional element through the passage opening comprising receiving a plurality of function elements through a plurality of passage openings, respectively.

* * * * *